(12) United States Patent
Choulet

(10) Patent No.: US 9,232,112 B2
(45) Date of Patent: Jan. 5, 2016

(54) METHOD AND APPARATUS FOR EFFECTING COLOR SEPARATION, COLOR VARIATION, COLOR CHARACTERIZATION, AND GAMUT MAPPING IN COLOR PRINTING

(71) Applicant: ELECTRONICS FOR IMAGING, INC., Foster City, CA (US)

(72) Inventor: Luc Choulet, Charnay les Macon (FR)

(73) Assignee: Electronics for Imaging, Inc., Fremont, CA (US)

( * ) Notice: Subject to any disclaimer, the term of this patent is extended or adjusted under 35 U.S.C. 154(b) by 0 days.

(21) Appl. No.: 13/945,771

(22) Filed: Jul. 18, 2013

(65) Prior Publication Data

US 2015/0022832 A1    Jan. 22, 2015

(51) Int. Cl.
*G06F 15/00* (2006.01)
*H04N 1/54* (2006.01)

(52) U.S. Cl.
CPC ...................................... *H04N 1/54* (2013.01)

(58) Field of Classification Search
CPC ............................................................ H04N 1/54
USPC ................................................. 358/1.15, 1.1
See application file for complete search history.

(56) References Cited

U.S. PATENT DOCUMENTS

| | | | |
|---|---|---|---|
| 5,142,337 A * | 8/1992 | Karidis et al. | 399/231 |
| 5,822,503 A | 10/1998 | Gass et al. | |
| 6,944,334 B2 | 9/2005 | Piatt et al. | |
| 7,920,297 B2 | 4/2011 | Doggett, III et al. | |
| 8,743,137 B2 | 6/2014 | Peters et al. | |
| 2003/0098986 A1 | 5/2003 | Pop | |
| 2004/0027416 A1 * | 2/2004 | Rosenberger et al. | 347/43 |
| 2004/0051874 A1 | 3/2004 | Kubitzek et al. | |
| 2004/0233463 A1 * | 11/2004 | Hersch et al. | 358/1.9 |
| 2005/0286085 A1 | 12/2005 | Lee | |
| 2006/0082844 A1 * | 4/2006 | White | 358/504 |
| 2007/0201062 A1 * | 8/2007 | Watanabe | 358/1.9 |
| 2010/0177327 A1 | 7/2010 | Maheshwari | |
| 2011/0234660 A1 | 9/2011 | Yoshida | |
| 2012/0081461 A1 * | 4/2012 | Kakutani | 347/43 |
| 2012/0105882 A1 | 5/2012 | Horita et al. | |
| 2012/0263512 A1 * | 10/2012 | Sakai et al. | 400/76 |

FOREIGN PATENT DOCUMENTS

FR    2983951 A1    6/2013

OTHER PUBLICATIONS

Stone, et al., "Color Gamut Mapping and The Printing of Digital Color Images", (1988)Journal of ACM Transactions on Graphics (TOG). vol. 7, Issue 4, 44 Pages.
"ColorThink Pro", CHROMiX ColorThink, retrieved online on Mar. 12, 2013 from url: http://www2.chromix.com/colorthink/pro/pro_colorcast; 2 pages, undated, 2 pages.

* cited by examiner

*Primary Examiner* — Martin Mushambo
(74) *Attorney, Agent, or Firm* — Michael A. Glenn; Perkins Coie LLP

(57) ABSTRACT

Embodiments of the invention concern automatic color separation with a white ink for colored and/or transparent substrate, automatic color separation with a silver ink for a natural rendering, automatic color separation with a varnish which has a gloss scale different from that of the printed sample for all shades of gloss that are possible between high glossy to high matte for a false third rendering, automatic color variation with variable thickness under the inks, and variable gamut mapping for a low contrast space.

4 Claims, 3 Drawing Sheets

METHOD AND APPARATUS FOR EFFECTING COLOR SEPARATION, COLOR VARIATION, COLOR CHARACTERIZATION, AND GAMUT MAPPING IN COLOR PRINTING

BACKGROUND OF THE INVENTION

1. Technical Field

The invention relates to color printing. More particularly, the invention relates to color printing with regard to color separation, color variation, color characterization, and gamut mapping.

2. Description of the Background Art

Modern color printing relies upon various well known techniques, such as color separation and halftone techniques.

Color Separation

The process of color separation starts by separating the original artwork into red, green, and blue components, for example by a digital scanner. Before digital imaging was developed, the traditional method of doing this was to photograph the image three times, using a filter for each color. However this is achieved, the desired result is three grey scale images, which represent the red, green, and blue (RGB) components of the original image.

The next step is to invert each of these separations. When a negative image of the red component is produced, the resulting image represents the cyan component of the image. Likewise, negatives are produced of the green and blue components to produce magenta and yellow separations, respectively. This is done because cyan, magenta, and yellow are subtractive primaries which each represent two of the three additive primaries (RGB) after one additive primary has been subtracted from white light.

Cyan, magenta, and yellow are the three basic colors used for color reproduction. When these three colors are variously used in printing, the result should be a reasonable reproduction of the original, but in practice this is not the case. Due to limitations in the inks, the darker colors are dirty and muddied. To resolve this, a black separation is also created, which improves the shadow and contrast of the image. Numerous techniques exist to derive this black separation from the original image; these include grey component replacement, under color removal, and under color addition. This printing technique is referred to as CMYK (the "K" stands for Key, a traditional word for the black printing plate).

Today's digital printing methods do not have the restriction of a single color space that traditional CMYK processes do. Many presses can print from files that were ripped with images using either RGB or CMYK modes. The color reproduction abilities of a particular color space can vary; the process of obtaining accurate colors within a color model is called color matching.

Color Characterization

To describe the behavior of various output devices, they must be compared (measured) in relation to a standard color space. Often a step called linearization is performed first to undo the effect of gamma correction that was done to get the most out of limited 8-bit color paths. Instruments used for measuring device colors include colorimeters and spectrophotometers. As an intermediate result, the device gamut is described in the form of scattered measurement data. The transformation of the scattered measurement data into a more regular form, usable by the application, is called profiling. Profiling is a complex process involving mathematics, intense computation, judgment, testing, and iteration. After the profiling is finished, an idealized color description of the device is created. This description is called a profile.

Gamut Mapping

Because different devices do not have the same gamut, they need some rearrangement near the borders of the gamut. Some colors must be shifted to the inside of the gamut, as they otherwise cannot be represented on the output device and would simply be clipped. For instance the dark highly saturated purplish-blue color of a typical computer monitor's "blue" primary is impossible to print on paper with a typical CMYK printer. The nearest approximation within the printer's gamut is much less saturated. Conversely, an inkjet printer's "cyan" primary, a saturated mid-brightness greenish-blue, is outside the gamut of a typical computer monitor. A color management system can use various methods to achieve desired results and give experienced users control of the gamut mapping behavior.

These and other techniques, provide a technical pallet with which color images may be printed. Unfortunately, these techniques alone often create as many problems as they solve. It would be advantageous to provide refined use of such techniques for color printing with regard to such aspects of color printing as color separation, color variation, color characterization, and gamut mapping.

SUMMARY OF THE INVENTION

Embodiments of the invention concern automatic color separation with a white ink for colored and/or transparent substrate, automatic color separation with a silver ink for a natural rendering, automatic color separation with a varnish which has a gloss scale different from that of the printed sample for all shades of gloss that are possible between high glossy to high matte for a false third rendering, automatic color variation with variable thickness under the inks, and variable gamut mapping for a low contrast space.

DETAILED DESCRIPTION OF THE INVENTION

Figure 1:
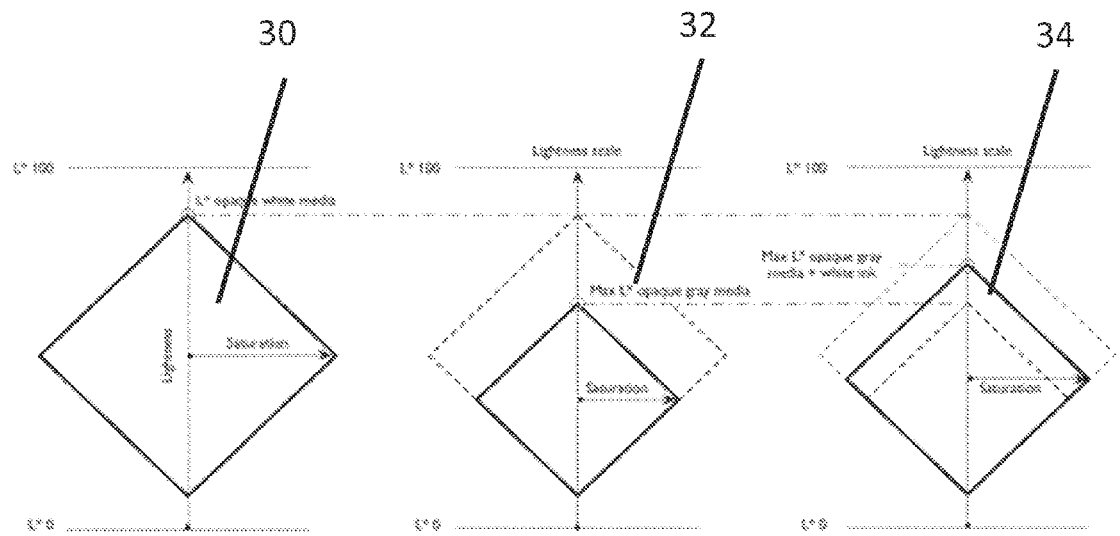
FIG. 1 is a diagram showing gamut mapping between a print on an opaque white media and an opaque gray media with white ink according to the invention.

Embodiments of the invention concern automatic color separation with a white ink for colored and/or transparent substrate, automatic color separation with a silver ink for a natural rendering, automatic color separation with a varnish which has a gloss scale different from that of the printed sample for all shades of gloss that are possible between high glossy to high matte for a false third rendering, automatic color variation with variable thickness under the inks, and variable gamut mapping for a low contrast space.

Halftone is the reprographic technique that simulates continuous tone imagery through the use of dots, varying either in size, in shape, or in spacing. Halftone can also be used to refer specifically to the image that is produced by this process.

Where continuous tone imagery contains an infinite range of colors or greys, the halftone process reduces visual reproductions to an image that is printed with only one color of ink, in dots of differing size. This reproduction relies on a basic optical illusion, i.e. that these tiny halftone dots are blended into smooth tones by the human eye. At a microscopic level, developed black-and-white photographic film also consists of only two colors, and not an infinite range of continuous tones.

Just as color photography evolved with the addition of filters and film layers, color printing is made possible by repeating the halftone process for each subtractive color, most commonly using what is called the CMYK color model. The semi-opaque property of ink allows halftone dots of different colors to create another optical effect, i.e. full-color imagery.

Automatic Color Separation with a White Ink for Colored Substrate

An embodiment of the invention generates a white layer that is graduated to compensate for the low contrast of an image when the image is printed on a opaque non-white substrate, e.g. gray, brown, black, etc. or on a non-opaque media, e.g. transparent film. The process inks, e.g. CMYK inks, must be mostly transparent, while the white ink must be mostly opaque.

In embodiments of the invention, gradients are managed by any of single halftoning, ink volume variation, and in combination with halftoning and ink volume variation, i.e. grey level management in digital printing. In embodiments of the invention, it is assumed that there is not any information about the white scale in the source image (source file) and, therefore, that it is necessary to generate an additional white variation in accordance with the image that contains, e.g. color information, spatial information, etc.

In the invention, color separation is automatic and does not require user expertise and/or knowledge. Many color separation strategies could be provided to the user to obtain different visual effects. For example, the user could mix different color separation strategies on the same image. Thus, one goal of the invention is to provide a way to obtain similar visual contrast to produce a natural rendering. Another goal of the invention is to make the final print robust, recognizing that overprinting inks on white ink could result in a decrease the scratch resistance of the print. Another goal of the invention is to use less white ink, thus saving money because white ink is very expensive. A further goal of the invention is to provide a mechanism for obtaining a better visual gamut (color space). Yet another goal of the invention is to protect a resulting print that exhibits one or more of the foregoing qualities.

The graduated information is printed with a white ink. FIG. 1 is a diagram showing gamut mapping between a print on an opaque white media and an opaque gray media with white ink according to the invention. In FIG. 1, the gamut for L* is maximum if the image is printed on an opaque white medium 30. Using the same inks and the same printing process for an opaque gray media, i.e. a non-white medium, there is a gamut reduction in two dimensions, i.e. Lightness and Saturation 32. Using the same inks and the same printing process for an opaque gray media, i.e. a non-white medium, but with an opaque white ink applied to the media first, there is a gamut extension ion two dimensions, i.e. Lightness and Saturation 34.

Figure 2:
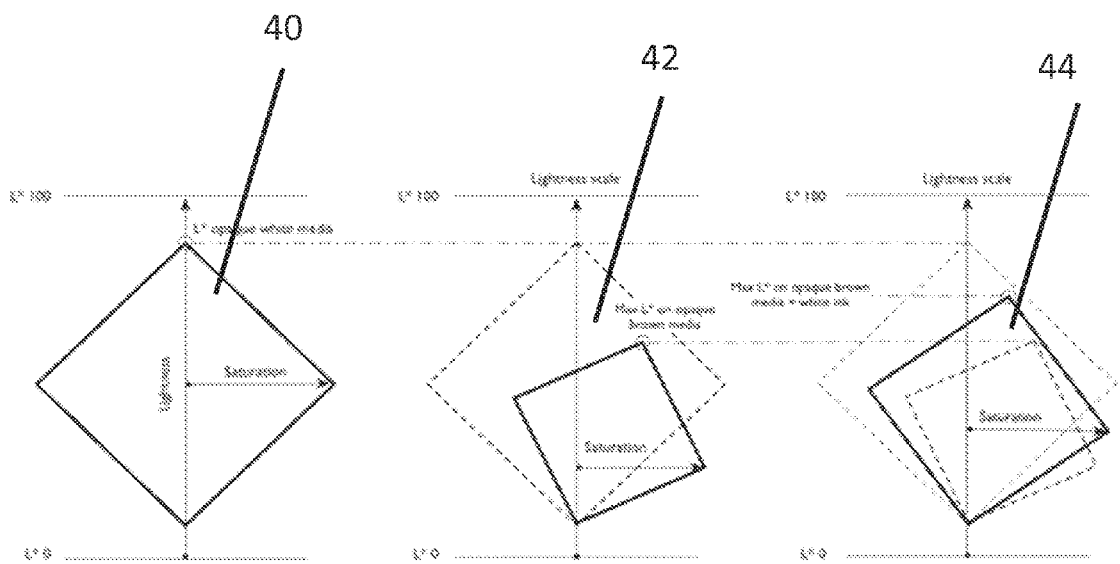
FIG. 2 is a diagram showing gamut mapping between a print on an opaque white media and an opaque brown media with white ink according to the invention.

FIG. 2 is a diagram showing gamut mapping between a print on an opaque white media and an opaque brown media with white ink according to the invention. In FIG. 2, the gamut for L* is maximum if the image is printed on an opaque white medium 40. Using the same inks and the same printing process for an opaque brown media, i.e. a non-white medium, there is a gamut reduction in two dimensions, i.e. Lightness and Saturation 42. Using the same inks and the same printing process for an opaque brown media, i.e. a non-white medium, but with an opaque white ink applied to the media first, there is a gamut extension in two dimensions, i.e. Lightness and Saturation 44.

A full tone, i.e. 100% of white, ink could be used under all of the CMYK values. This is not complicated to define and easy to do, but could generate some defects and limitations. For a CMYK color separation, CMY colors are typically used under the Black ink to improve the darkest values. One could use 240 to 320% of total ink printed, as compared to a theoretical maximum of 400%. In such case, it would be desirable to find a best compromise between the total ink printed and the darkest values because increasing the % of total ink generates problems, for example, with drying, macula, total ink thickness, and physical resistance. If 100% of white ink is added under the CMYK values, then this increases the maximum ink from 340% (240+100) to 420% (320+100). Due to the fact that the white opaque ink is printed first, under the CMYK inks, the white ink could also increase the drying time of the CMYK inks. Accordingly, adding a complete full tone of white inks under the CMYK inks generates several technical issues during and after printing, and could affect the final print quality. Further, adding a full tonal white layer is an extreme cost factor. This is why this approach is not preferred.

A goal of the invention herein disclosed is to add the white ink where it is needed under a color perspective, while always trying to reduce the amount of white ink at the same time from a total ink perspective. In a preferred embodiment of the invention, the white layer variation is made by halftoning the white ink in a manner that is similar to that used with a color shade.

Adding white under the dark values of CMYK, e.g. 80/60/60/100 for 300% max inks, does not necessarily increase the darkest values and could also, in the worst case, decrease the darkest value. One could consider, then, that the darkest values do not need white inks under the CMYK inks. One could also consider that the darkest values are generally defined by pure black ink (0/0/0/K>>50%); a trichrome combination of chromatic primaries with higher values, e.g. 100/80/80/0 give theoretically 80% of black value, which is the minimum value for the trichrome combination; and a mixing of a trichrome combination of chromatic primaries and black, e.g. 100/80/80/100.

Accordingly, an embodiment of the invention provides a rule for making a smooth transition between the areas with white ink and those without white inks. Thus, an embodiment of the invention uses the CMYK space to define the relation and the amount of white, and fixes the extremas anchor points as follows:

Visible media=0/0/0/0: we need the maximum lightness and fix it at 0/0/0/0/100;
Darkest black=0/0/0/100: we do not need white and fix it at 0/0/0/100/0;
Darkest CMY=100/100/100/0: we do not need white and fix it at 100/100/100/0/0;
Darkest CMY+K=100/100/100/100: we do not need white and fix it at 100/100/100/100/0;
Chromatic full tone of primaries:
  100/0/0/0 is fixed at 100/0/0/0/100
  0/100/0/0 is fixed at 0/100/0/0/100
  0/0/100/0 is fixed at 0/0/100/0/100;
Chromatic combinations of two primaries full tone:
  100/100/0/0 is fixed at 100/100/0/0/100
  0/100/100/0 is fixed at 0/100/100/0/100
  100/0/100/0 is fixed at 100/0/100/0/100; and Any combination with black does not need white in reverse proportion.

All of these anchor points provide the ability to generate the other combinations by a linear interpolation and create a look-up-table (LUT) for a conversion from CMYK to CMYK+W. This LUT could be a ICC profile Device Link (4 to 5) for compatibility with existing color management software. These anchor points are summarized in Table 1 below.

TABLE 1

Anchor Points

| CMYK input | | | | CMYK + W output | | | | |
|---|---|---|---|---|---|---|---|---|
| C | M | Y | K | C | M | Y | K | W |
| 0 | 0 | 0 | 0 | 0 | 0 | 0 | 0 | 100 |
| 100 | 0 | 0 | 0 | 100 | 0 | 0 | 0 | 100 |
| 0 | 100 | 0 | 0 | 0 | 100 | 0 | 0 | 100 |
| 0 | 0 | 100 | 0 | 0 | 0 | 100 | 0 | 100 |
| 100 | 100 | 0 | 0 | 100 | 100 | 0 | 0 | 100 |
| 0 | 100 | 100 | 0 | 0 | 100 | 100 | 0 | 100 |
| 100 | 0 | 100 | 0 | 100 | 0 | 100 | 0 | 100 |
| 0 | 0 | 0 | 100 | 0 | 0 | 0 | 100 | 0 |
| 100 | 100 | 100 | 100 | 100 | 100 | 100 | 100 | 0 |
| 100 | 100 | 100 | 0 | 100 | 100 | 100 | 0 | 0 |
| 100 | 100 | 0 | 100 | 100 | 100 | 0 | 100 | 0 |
| 100 | 0 | 100 | 100 | 100 | 0 | 100 | 100 | 0 |
| 0 | 100 | 100 | 100 | 0 | 100 | 100 | 100 | 0 |
| 100 | 0 | 0 | 100 | 100 | 0 | 0 | 100 | 0 |
| 0 | 100 | 0 | 100 | 0 | 100 | 0 | 100 | 0 |
| 0 | 0 | 100 | 100 | 0 | 0 | 100 | 100 | 0 |

Following this method, a linear interpolation for an input value as 0/0/0/50 gives 0/0/0/50/50. This is one of the relations that is possible between the device space input and the device space output.

In an embodiment of the invention, this approach could be extended for more than 4CLR, e.g. CMYK+Orange+Green, or less than 4CLR, e.g. for Black and white ink only.

In an embodiment of the invention, a weighting could be defined based on selected colorimetric values, e.g. mostly based on the Lightness (L*) and the Saturation (C*) of the printed color or the primary inks.

Embodiments of the invention could also convert the source file in another device space, such as HSV, TSL, or in a virtual space (vLCh; see U.S. patent Ser. No. 13/843,768, filed Mar. 15, 2013), and use, for example, one to three dimensions as a modulation function for creating the white output.

In an embodiment of the invention, a non-linear interpolation could be applied or a correction could be made on the white channel with a 1 D curve or a gamma factor, if there are some colorimetric benefits after analysis of the calibration chart.

Generation of Color Separation

In an embodiment of the invention, the color separation is automatic. There are many possibilities that depend upon whether or not it is desired to manage the color adaptation.

Simple Method

Start with a CMYK file that is being used for printing on a white opaque media, and convert the CMYK input to CMYKW output. To achieve a similar perceptual gradient of shades, it is necessary to make a device linearization for the white ink. Due to the fact that there is no official standard in dot gain, as computed with density reflectance, a linear relation between the White % and the L* value of a gradient of % printed on the non-white substrate is determined. This approach is only a Device-to-Device conversion, and does not take into consideration the colorimetric values.

Colorimetric Method

For more accurate management of the gamut mapping in a colorimetric space, such as CIEL*a*b*, CIEL*C*h, XYZ, or equivalent, it is necessary to determine a relation between the device (n)CLR+white and a colorimetric value. A static method, such as ICC profile generation, could be used based on the measurement. It is also necessary to define a gamut mapping strategy adapted to this color space difference. See FIG. 2.

Considering that the herein disclosed CSS (Color Separation Strategy) for adding a white channel provides a better and simple compromise between final gamut and technical constraint, e.g. for total ink printed, one input value in device space, such as CMYK, or in colorimetric space, such as CIEL*a*b*, can be defined that provides a unique value. By this way, the color separation is simple and automatic.

White Generation Including User Constraint

One of embodiment of the invention provides the ability for the user to merge his own White generation with the automatic White generation. In a source file, the user needs to predefine, on one or more alpha channels, a gradient for determining where the user wants to apply the White channel, e.g. for an 8-bit channel: 0 is no White, 255 is 100% White). The combination with the automatic White generation is defined for each and/or all alpha channels that have predefined rules for the channel interactions. These rules are defined using blending modes, e.g. for three simple rules:

Merge: allows the user to add White content to the existing automatic White channel (White addition);

Priority: erases all White content from other channels (White exclusion). It gives the current channel the priority to the existing automatic White channel; and Mask: uses the channel gray levels to define where to apply White from the automatic White generation and all enabled channels below.

Presently preferred formulae for applying this embodiment of the invention include:

$Wu$ =% white defined the User in the alpha channel
$Wa$ =% white defined by the algorithm $$\text{Merge \%} = \max(Wu+Wa:1)$$

$$\text{Priority \%} = \max(Wu:Wa)$$

$$\text{Mask \%} = Su \times Sa$$

Other blending mode could be also created for more effects.

Automatic Color Separation with a Silver Ink for a Natural Rendering

An embodiment of the invention generates a metallic layer that is graduated, where the gradient information is calculated from color information contained in the source image. This embodiment of the invention creates a specular effect by printing the colored inks, e.g. CMYK, on the metallic ink, e.g. Silver. In an embodiment of the invention, the process inks, e.g. CMYK inks, must be mostly transparent, while the metallic ink must be mostly opaque. The half-tone information is printed with a silver or gold ink, i.e. any kind of metallic inks. This embodiment of the invention also applies to other inks, such as nacreous inks.

In embodiments of the invention, gradients are managed by any of single halftoning, ink volume variation, and in combination with halftoning and ink volume variation, i.e. grey level management in digital printing. In embodiments of the invention, it is assumed that there is not any information about the silver scale in the source image (source file) and, therefore, that it is necessary to generate an additional silver variation in accordance with the image that contains, e.g. color information, spatial information, etc.

In the invention, color separation is automatic and does not require user expertise and/or knowledge. Many color separation strategies could be provided to the user to obtain different visual effects. For example, the user could mix different color separation strategies on the same image. Thus, one goal of the invention is to provide a way to obtain similar visual contrast to produce a natural rendering and/or to generate a pleasant visual effect. Another goal of the invention is to make the final print robust, recognizing that overprinting inks on metallic ink could result in a decrease the scratch resistance of the print. Another goal of the invention is to use less metallic ink, thus saving money because metallic ink is very expensive. A further goal of the invention is to provide a mechanism for obtaining a better visual gamut (color space). Yet another goal of the invention is to protect a resulting print that exhibits one or more of the foregoing qualities.

In an embodiment of the invention, the color separation is automatic, as discussed above.

An embodiment of the invention generates a silver layer that is graduated and printed first, under all of the other colors, to mask a certain level the color of the media (white, transparent, . . . ) and generate metallic shades by combination (or not) of the other colors. In embodiments of the invention, the gradients are managed by any of single halftoning, ink volume variation, and in combination with halftoning and ink volume variation, e.g. grey level management in digital printing. In embodiments of the invention, the user could mix different Silver ink generations on the same image.

The process inks, e.g. CMYK inks, must be mostly transparent, while the silver ink is generally opaque due to the metallic particles in the ink. For a metallic shade, it is preferred to have a level of silver inks >0%. For a colored metallic shade, it is preferred to have a level of silver inks >0% and a level of process inks, e.g. CMYK inks, overprinted on the silver layer >0%. After a good linearization, ink limitation, or ink density, the maximum visible effect is provided when a silver inks near 100% and the level of process inks, e.g. CMYK, is ≤200%.

For a realistic image perception, it is preferred to keep a similar perception of contrast, saturation, and less hue change.

The metallic effect is given by the intensity of light reflected, i.e. specular or diffuse. For specular mode, embodiments of the invention start with a print that does not have metallic ink and that is printed on a heavy glossy media as reference. The ratio between the light sent and received at the normal angle is fixed at 1:1. With this same method, a metallic media has a reflectance intensity ≥100%.

If the silver layer is very flat and uniform, a mirror effect with distinctness of image (DOI) as a function of the sharpness of a reflected image in a coating surface) is obtained and the specular effect is maximum at the normal angle.

If the silver layer is very noisy due to halftone, media, size of the metallic particle, etc., a mirror effect is not obtained (bad DOI) and the specular effect is diffuse at the normal angle.

For a 45/0° spectral reflectance measurement, a metallic full tone printed has a similar reflectance as that of a single diffuse color. Under this geometry, if the metallic ink is silver, there is a similar reflectance as a that of medium or dark gray ink without any metallic and/or specular effect.

In this same position for a visual observance, it is desired to obtain similar contrast with or without similar saturation. To compute the color separation and gamut mapping, the metallic silver ink is considered to be similar to a diffuse gray ink.

Color Separation Strategy (CSS)

In embodiments of the invention, it is assumed that there is not any information about the metallic scale in the source image (source file) and, therefore, that it is necessary to generate an additional metallic variation in accordance with the image that contains, e.g. color information, spatial information, etc.

In embodiments of the invention, the CSS is split into three different cases:
  Maintain a similar lightness relationship for the neutral areas, which are the most important parameter for human perception and, if possible, for all of the colors.
  Maintain a similar lightness relationship for the neutral areas only, and variable lightness for all the colors, e.g. to create special effects.
  Generate a special lightness relationship for the neutral areas and for all the colors, from image analysis and/or from an additional channel, e.g. depth, e.g. to create special effects.

A full tone, i.e. 100% of silver ink could be used under all of the CMYK values. This is not complicated to define and easy to do, but could generate some defects and limitations. For a CMYK color separation, CMY colors are typically used under the silver ink to improve the darkest values. One could use 240 to 320% of total ink printed, as compared to a theoretical maximum of 400%. In such case, it would be desirable to find a best compromise between the total ink printed and the darkest values because increasing the % of total ink generates problems, for example, with drying, macula, total ink thickness, and physical resistance. If 100% of silver ink is added under the CMYK values, then this increases the maximum ink from 340% (240+100) to 420% (320+100). Due to the fact that the silver opaque ink is printed first under the CMYK inks, the silver ink could also increase the drying time of the CMYK inks. Accordingly, adding a complete full tone of white inks under the CMYK inks generates several technical issues during and after printing, and could affect the final print quality. This is why the foregoing approach is not preferred.

One goal of the invention herein disclosed is to add the silver ink where it is needed from a color perspective while, at the same time, reducing the amount of silver ink from a total ink perspective. In a preferred embodiment of the invention, the silver layer variation is made by halftoning the silver ink in a manner that is similar to that used with a color shade.

Adding silver under the dark values of CMYK, e.g. 80/60/60/100 for 300% maximum ink, does not necessarily increase the darkest values and could also, in the worst case, decrease the darkest value. One could consider, then, that the darkest values do not need silver inks under the CMYK inks. One could also consider that the darkest values are generally defined by pure black ink (0/0/0/K>>50%); a trichrome combination of chromatic primaries with higher values, e.g. 100/80/80/0 give theoretically 80% of black value, which is the minimum value for the trichrome combination; and a mixing of a trichrome combination of chromatic primaries and black, e.g. 100/80/80/100.

Accordingly, an embodiment of the invention provides a rule for making a smooth transition between the areas with silver ink and those without silver inks. Thus, an embodiment of the invention uses the CMYK space to define the relation and the amount of silver, and fixes the extremas anchor points as follows, with some variations being possible if it is desired to provide special effects:
  Visible media=0/0/0/0: Maximum lightness is needed, use CMYK without silver ink=0/0/0/0/0;

Darkest black=0/0/0/100: silver ink ink is not needed, use CMYK without silver ink=0/0/0/100/0;
Darkest CMY=100/100/100/0: silver ink ink is not needed, use CMYK without silver ink=100/100/100/0/0;
Darkest CMY+K=100/100/100/100: silver ink ink is not needed, use CMYK+without silver ink=100/100/100/100/0.

It is, therefore, only necessary to find equal optical density (reflectance) for a silver full tone and a % K, a % CMY and a % CMYK to build a transition and look up table or transfer function, e.g. 100% Silver is equal to 50% black, and equal to 60/50/50 CMY:

Chromatic full tone of primaries and/or combinations of two primaries if maximum metallic effect is desired:
100/0/0/0 is fixed at 100/0/0/0/100
0/100/0/0 is fixed at 0/100/0/0/100
0/0/100/0 is fixed at 0/0/100/0/100
100/100/0/0 is fixed at 100/100/0/0/100
0/100/100/0 is fixed at 0/100/100/0/100
100/0/100/0 is fixed at 100/0/100/0/100

Chromatic full tone of primaries and/or combinations of two primaries if no metallic effect is desired:
100/0/0/0 is fixed at 100/0/0/0/0
0/100/0/0 is fixed at 0/100/0/0/0
0/0/100/0 is fixed at 0/0/100/0/0
100/100/0/0 is fixed at 100/100/0/0/0
0/100/100/0 is fixed at 0/100/100/0/0
100/0/100/0 is fixed at 100/0/100/0/0

For any creative approach, there can be many variations of these simples rules, which can be provided to a user as, e.g. one or more presets, to give the user many choices for obtaining different visual effects in accordance with the user's creative expectation. For creative effects, it is also possible to fix, for example, any of a relation between the amount of silver and a hue, a saturation value, a density value, a amount of ink, an additional channel, e.g. depth, etc.

For example, chromatic full tone of primaries and/or combinations of two primaries when a special effect is desired for metallic inks is as follows:
100/0/0/0 is fixed at 100/0/0/0/100
0/100/0/0 is fixed at 0/100/0/0/50
0/0/100/0 is fixed at 0/0/100/0/0
100/100/0/0 is fixed at 100/100/0/0/50
0/100/100/0 is fixed at 0/100/100/0/0
100/0/100/0 is fixed at 100/0/100/0/100

All of these anchor points provide the ability to generate the other combinations by a linear interpolation and create a look-up-table (LUT) for a conversion from CMYK to CMYK+Silver. This LUT could be a ICC profile device link (4 to 5) for compatibility with existing color management software. These anchor points for a certain CSS strategy are summarized in Table 2 and Table 3 below as examples.

TABLE 2

Anchor Points for CSS 1
Color Strategy #1

| CMYK input | | | | CMYK + Silver output | | | | |
|---|---|---|---|---|---|---|---|---|
| C | M | Y | K | C | M | Y | K | S |
| 0 | 0 | 0 | 0 | 0 | 0 | 0 | 0 | 0 |
| 100 | 0 | 0 | 0 | 100 | 0 | 0 | 0 | 100 |
| 0 | 100 | 0 | 0 | 0 | 100 | 0 | 0 | 100 |
| 0 | 0 | 100 | 0 | 0 | 0 | 100 | 0 | 100 |
| 100 | 100 | 0 | 0 | 100 | 100 | 0 | 0 | 100 |
| 0 | 100 | 100 | 0 | 0 | 100 | 100 | 0 | 100 |
| 100 | 0 | 100 | 0 | 100 | 0 | 100 | 0 | 100 |

TABLE 2-continued

Anchor Points for CSS 1
Color Strategy #1

| CMYK input | | | | CMYK + Silver output | | | | |
|---|---|---|---|---|---|---|---|---|
| C | M | Y | K | C | M | Y | K | S |
| 0 | 0 | 0 | 100 | 0 | 0 | 0 | 100 | 0 |
| 100 | 100 | 100 | 100 | 100 | 100 | 100 | 100 | 0 |
| 100 | 100 | 100 | 0 | 100 | 100 | 100 | 0 | 0 |
| 100 | 100 | 0 | 100 | 100 | 100 | 0 | 100 | 0 |
| 100 | 0 | 100 | 100 | 100 | 0 | 100 | 100 | 0 |
| 0 | 100 | 100 | 100 | 0 | 100 | 100 | 100 | 0 |
| 100 | 0 | 0 | 100 | 100 | 0 | 0 | 100 | 0 |
| 0 | 100 | 0 | 100 | 0 | 100 | 0 | 100 | 0 |
| 0 | 0 | 100 | 100 | 0 | 0 | 100 | 100 | 0 |
| 0 | 0 | 0 | 50 | 0 | 0 | 0 | 0 | 100 |
| 60 | 50 | 50 | 0 | 0 | 0 | 0 | 0 | 100 |

TABLE 3

Anchor Points for CSS 2
Color Strategy #2

| CMYK input | | | | CMYK + Silver output | | | | |
|---|---|---|---|---|---|---|---|---|
| C | M | Y | K | C | M | Y | K | S |
| 0 | 0 | 0 | 0 | 0 | 0 | 0 | 0 | 0 |
| 100 | 0 | 0 | 0 | 100 | 0 | 0 | 0 | 0 |
| 0 | 100 | 0 | 0 | 0 | 100 | 0 | 0 | 0 |
| 0 | 0 | 100 | 0 | 0 | 0 | 100 | 0 | 0 |
| 100 | 100 | 0 | 0 | 100 | 100 | 0 | 0 | 0 |
| 0 | 100 | 100 | 0 | 0 | 100 | 100 | 0 | 0 |
| 100 | 0 | 100 | 0 | 100 | 0 | 100 | 0 | 0 |
| 0 | 0 | 0 | 100 | 0 | 0 | 0 | 100 | 0 |
| 100 | 100 | 100 | 100 | 100 | 100 | 100 | 100 | 0 |
| 100 | 100 | 100 | 0 | 100 | 100 | 100 | 0 | 0 |
| 100 | 100 | 0 | 100 | 100 | 100 | 0 | 100 | 0 |
| 100 | 0 | 100 | 100 | 100 | 0 | 100 | 100 | 0 |
| 0 | 100 | 100 | 100 | 0 | 100 | 100 | 100 | 0 |
| 100 | 0 | 0 | 100 | 100 | 0 | 0 | 100 | 0 |
| 0 | 100 | 0 | 100 | 0 | 100 | 0 | 100 | 0 |
| 0 | 0 | 100 | 100 | 0 | 0 | 100 | 100 | 0 |
| 0 | 0 | 0 | 50 | 0 | 0 | 0 | 0 | 100 |
| 60 | 50 | 50 | 0 | 0 | 0 | 0 | 0 | 100 |

Following this method, a linear interpolation for an input value as 0/0/0/25 gives 0/0/0/0/50. This is one of the relations that is possible between the device space input and the device space output.

In an embodiment of the invention, this approach could be extended for more than 4CLR, e.g. CMYK+Orange+Green, or less than 4CLR, e.g. for Black and Silver ink only.

In an embodiment of the invention, a weighting could be defined based on selected colorimetric values, e.g. mostly based on the Lightness (L*) and the Saturation (C*) of the printed color or the primary inks.

In embodiments of the invention, it is also possible to convert the source file in another device space, such as HSV, TSL, or in virtual space (vLCh; see U.S. patent Ser. No. 13/843,768, filed Mar. 15, 2013), and use one to three dimensions as a modulation function for creating the Silver output.

In an embodiment of the invention, a non-linear interpolation could be applied or a correction could be made on the white channel with a 1D curve or a gamma factor, if there are some colorimetric benefits after analysis of the calibration chart.

Generation of Color Separation

In an embodiment of the invention, the color separation is automatic. There are many possibilities that depend upon whether or not it is desired to manage the color adaptation.

Simple Method

Start with a CMYK file that is being used for printing on a white opaque media, and convert the CMYK input to CMYK-Silver output. To achieve a similar perceptual gradient of shades, it is necessary to make a device linearization for the Silver ink. This approach is only a device-to-device conversion, and does not take into consideration the colorimetric values.

Colorimetric Method

For more accurate management of the gamut mapping in a colorimetric space, such as CIEL*a*b*, CIEL*C*h, XYZ, or equivalent, it is necessary to determine a relation between the device (n)CLR+Silver and a colorimetric value. A static method, such as ICC profile generation, could be used based on the measurement. It is also necessary to define a gamut mapping strategy adapted to this color space difference.

Considering that the herein disclosed CSS (color separation strategy) for adding a Silver channel provides a better and simple compromise between final gamut and technical constraint, e.g. for total ink printed, one input value in device space, such as CMYK, or in colorimetric space, such as CIEL*a*b*, can be defined that provides a unique value. By this way, the color separation is simple and automatic.

Silver Generation Including User Constraint

An embodiment of the invention provides the user with the ability to merge his own Silver generation with the automatic Silver generation. In the source file, the user needs to pre-define, for one or more alpha channels, a gradient for defining where the user wants to apply the Silver channel, e.g. for an 8-bit channel: 0 is no Silver, 255 is 100% Silver. The combination with the automatic Silver generation is defined for each and/or all alpha channels with pre-defined rules for the channel interactions. These rules are defined using blending modes, e.g. for three simple rules:

Merge: allows the user to add Silver content to the existing automatic Silver channel (Silver addition);

Priority: erases all Silver content from other channels (Silver exclusion). It gives the current channel the priority for automatic Silver channel; and Mask: uses the channel gray levels to define where to apply silver from the automatic Silver generation and all enabled channels below.

Presently preferred formulae for applying this embodiment of the invention include:

Su=% silver defined the User in the alpha channel
Sa=% silver defined by the algorithm $$\text{Merge \%} = \max(Su+Sa:1)$$

$$\text{Priority \%} = \max(Su:Sa)$$

$$\text{Mask \%} = Su \times Sa$$

Other blending mode could be also created for more effects.

Automatic Color Separation with a Gloss and/or Matt Varnish for a False 3D Rendering or Contrast/Saturation Modulation An embodiment of the invention generates one or more gloss layers that are graduated, where the gradient information is calculated from the color information contained in the source image. This embodiment of the invention creates a gloss effect by printing the colored inks, e.g. CMYK, under the gloss or matt ink or varnish, e.g. transparent inks, with or without color. In an embodiment of the invention, the process inks, e.g. CMYK inks, must be mostly transparent, while the varnish inks must also be mostly transparent. An embodiment of the invention uses a one or two gloss scale to increase the effect and extend the scale of the effect, e.g. a gloss varnish and a matt varnish.

In embodiments of the invention, gradients are managed by any of single halftoning, ink volume variation, and in combination with halftoning and ink volume variation, i.e. grey level management in digital printing.

In an embodiment of the invention, one or more than one varnish layer generation color appearance separation strategy (CASS) could be provided to the user by which different visual effects could be obtained. CASS is automatic and does not require user expertise and/or knowledge. In embodiments of the invention, the user could mix different CASS on the same image. One goal of the invention is to provide a way for adding a smooth and increased/decreased visual contrast and/or saturation variation to that of a natural rendering. A further goal of the invention is to provide a mechanism for obtaining a better visual gamut (color space). Yet another goal of the invention is to protect a resulting print that exhibits one or more of the foregoing qualities.

An embodiment of the invention generates one or more varnish layers that are graduated and printed at least over all of the other colors to modulate in a certain level the gloss of each color and generate gloss shades by combination (or not) of the other varnish layers, e.g. using different shades of gloss from heavy glossy to heavy matte.

The process inks, e.g. CMYK inks, must be mostly transparent, while the varnish layer must be transparent and without a strong color influence; at the thickness currently printed, e.g. from the µm range to about 1 mm. Only the gloss scale is a main parameter for color appearance modulation. In this regard, the color appearance modulation could be visible by a human perception only if there is a difference of gloss between some areas of the image or printed samples.

Parameters for gloss difference can include:

Difference between the gloss of the media and the gloss of the varnish

Difference between the gloss of the inks and the gloss of the varnish

Difference between the gloss of varnish #1 and gloss of varnish #2; and

All combinations between the foregoing possibilities

The perception is highly visible if the gloss difference is important. Considering a gloss scale (GU60) between 1 (heavy matt) and 100 (heavy glossy), the goal is to increase the gloss difference. For example, if the gloss of the inks is GU30 and the gloss of the varnish #1 is GU90, a second varnish #2 having a GU5 could be applied to increase the visual gloss dynamic. To achieve for a complete and logical graduation, the varnish #2 could be printed as a linear negative of the varnish #1.

For a natural rendering, it is better to have very logical transition between the image content and the gloss scale. For example, if there is a smooth gradient between Blue and Red, it is necessary to have the same smooth gradient between matte (on Blue) and gloss (on Red). These gradients are managed by any of single halftoning, ink volume variation, and in combination with halftoning and ink volume variation, e.g. grey level management in digital printing).

For special effects, the varnish formulation could also contain some small particles (charge), such as small nacreous particles, metallic particles and/or some chemical component for color influence, e.g. fluorescent in visible spectrum, optical brightener, etc.

The gloss influence on the color perception must be taken into account. because a gloss varnish applied on a color gives a more saturated and more contrasted color when compared to a matte varnish applied on the same color. In other words, a matte varnish decreases the color gamut and a gloss varnish increases the color gamut. For a realistic image perception, it is preferable to keep a similar perception of contrast, saturation, and less hue change.

Color Appearance Separation Strategy (CASS)

In embodiments of the invention, it is assumed that there is not any information about the gloss scale in the source image (source file) and, therefore, that it is necessary to generate an additional gloss variation in accordance with the image that contains, e.g. color information, spatial information, etc.

In embodiments of the invention, the CASS is split into two different cases:
- Increase visible gamut by gloss and/or matte difference according to the colors or/and lightness and/or saturation and/or an additional channel, e.g. depth, of the source file.
- Create special effects with a custom relation with the colors or/and lightness and/or saturation and/or an additional channel, e.g. depth, of the source file.

Accordingly, an embodiment of the invention provides a rule for making a smooth transition between the areas with gloss and matte areas, where such areas are made by varnish, by the media itself, and/or by the inks themselves. Thus, an embodiment of the invention uses the CMYK space to define the relation and the amount of gloss variation and fixes the extremas anchor points.

For any creative approach there can be many variations of these simples rules, for example variation may be provided to the user as one or more 'presets,' thus giving the user many choices for obtaining different visual effects in accordance with the user's creative expectation.

In embodiments of the invention, for creative effects a relationship can be fixed between the amount of gloss and a hue, a saturation value, a density value, an amount of ink, etc.

Such anchor points provide the ability to generate the other combinations by a linear interpolation and create a look-up-table (LUT) for a conversion from CMYK to CMYK+gloss level. Such LUT could be a ICC profile device link (4 to 5) for compatibility with existing color management software. These anchor points for a certain CASS strategy are summarized in Table 4 and Table 5 below as examples. For purposes of the discussion herein, gloss level is a relative scale and is defined as GL, where GL=0 is a higher matte level and GL=100 is a higher glossy level.

TABLE 4

Anchor Points for CASS 1
Color Appearance Strategy #1

| CMYK input | | | | CMK + Gloss Level output | | | | |
|---|---|---|---|---|---|---|---|---|
| C | M | Y | K | C | M | Y | K | GL |
| 0 | 0 | 0 | 0 | 0 | 0 | 0 | 0 | 0 |
| 100 | 0 | 0 | 0 | 100 | 0 | 0 | 0 | 100 |
| 0 | 100 | 0 | 0 | 0 | 100 | 0 | 0 | 100 |
| 0 | 0 | 100 | 0 | 0 | 0 | 100 | 0 | 100 |
| 100 | 100 | 0 | 0 | 100 | 100 | 0 | 0 | 100 |
| 0 | 100 | 100 | 0 | 0 | 100 | 100 | 0 | 100 |
| 100 | 0 | 100 | 0 | 100 | 0 | 100 | 0 | 100 |
| 0 | 0 | 0 | 100 | 0 | 0 | 0 | 100 | 0 |
| 100 | 100 | 100 | 100 | 100 | 100 | 100 | 100 | 0 |
| 100 | 100 | 100 | 0 | 100 | 100 | 100 | 0 | 0 |
| 100 | 100 | 0 | 100 | 100 | 100 | 0 | 100 | 50 |
| 100 | 0 | 100 | 100 | 100 | 0 | 100 | 100 | 50 |
| 0 | 100 | 100 | 100 | 0 | 100 | 100 | 100 | 50 |
| 100 | 0 | 0 | 100 | 100 | 0 | 0 | 100 | 50 |
| 0 | 100 | 0 | 100 | 0 | 100 | 0 | 100 | 50 |
| 0 | 0 | 100 | 100 | 0 | 0 | 100 | 100 | 50 |

TABLE 5

Anchor Points for CASS 2
Color Appearance Strategy #2

| CMYK input | | | | CMYK + Gloss Level output | | | | |
|---|---|---|---|---|---|---|---|---|
| C | M | Y | K | C | M | Y | K | GL |
| 0 | 0 | 0 | 0 | 0 | 0 | 0 | 0 | 0 |
| 100 | 0 | 0 | 0 | 100 | 0 | 0 | 0 | 100 |
| 0 | 100 | 0 | 0 | 0 | 100 | 0 | 0 | 100 |
| 0 | 0 | 100 | 0 | 0 | 0 | 100 | 0 | 100 |
| 100 | 100 | 0 | 0 | 100 | 100 | 0 | 0 | 100 |
| 0 | 100 | 100 | 0 | 0 | 100 | 100 | 0 | 100 |
| 100 | 0 | 100 | 0 | 100 | 0 | 100 | 0 | 100 |
| 0 | 0 | 0 | 100 | 0 | 0 | 0 | 100 | 0 |
| 100 | 100 | 100 | 100 | 100 | 100 | 100 | 100 | 0 |
| 100 | 100 | 100 | 0 | 100 | 100 | 100 | 0 | 0 |
| 100 | 100 | 0 | 100 | 100 | 100 | 0 | 100 | 0 |
| 100 | 0 | 100 | 100 | 100 | 0 | 100 | 100 | 0 |
| 0 | 100 | 100 | 100 | 0 | 100 | 100 | 100 | 0 |
| 100 | 0 | 0 | 100 | 100 | 0 | 0 | 100 | 0 |
| 0 | 100 | 0 | 100 | 0 | 100 | 0 | 100 | 0 |
| 0 | 0 | 100 | 100 | 0 | 0 | 100 | 100 | 0 |

Following this method, a linear interpolation for an input value of 0/0/0/50 returns 0/0/0/50/50. This is one of the relations that is possible between the device space input and the device space output.

In an embodiment of the invention, this approach could be extended for more than 4CLR, e.g. CMYK+Orange+Green, or less than 4CLR, e.g. for Black and Silver ink only.

In an embodiment of the invention, a weighting could be defined based on selected colorimetric values, e.g. mostly based on the Lightness (L*) and the Saturation (C*) of the printed color or the primary inks and/or with a combination of an additional channel, e.g. depth.

In embodiments of the invention, the source file can be converted in another device space, such as HSV, TSL, or in virtual space (vLCh; see U.S. patent Ser. No. 13/843,768, filed Mar. 15, 2013), and use, for example, one to three dimensions as a modulation function to create the varnish output.

In an embodiment of the invention, a non-linear interpolation could be applied or a correction could be made on the each Gloss channel with a 1D curve or a gamma factor, if there are some colorimetric and/or gloss benefits after analysis of the calibration chart.

When the gloss level is defined, it is necessary to convert the gloss scale in amount of varnish. Thus:
- If the varnish is glossy, then % glossy varnish=% GL
- If the varnish is matte, then % matte varnish=(1−%) GL
- If both matt and glossy varnish is used at the same time then, for example, % glossy varnish=1−(% matte varnish)

Generation of Channel Separation

In an embodiment of the invention, the color separation is automatic. There are many possibilities that depend upon whether or not it is desired to manage the color adaptation.

Simple Method

Start with a CMYK file that is being used for printing on a white opaque media, and convert the CMYK input to CMYK+varnish output. To achieve a similar perceptual gradient of shades, it is necessary to make a device linearization for the varnish shades. For example, a 1D curve could be created for a linear relation between the gloss variation and the amount of varnish.

This approach is only a device-to-device conversion and does not take into consideration the colorimetric values.

Colorimetric Method

For more accurate management of the gamut mapping in a colorimetric space, such as CIEL*a*b*, CIEL*C*h, XYZ, or equivalent, it is necessary to determine a relation between the device (n)CLR+varnish and a colorimetric value. A static method, such as ICC profile generation, could be used based on the measurement. It is also necessary to define a gamut mapping strategy adapted to this color space difference.

Considering that the herein disclosed CSS) for adding a varnish channel provides a better and simple compromise between final gamut and technical constraint, e.g. for total ink printed, one input value in device space, such as CMYK, or in colorimetric space, such as CIEL*a*b*, can be defined that provides a unique value. By this way, the color separation is simple and automatic.

Varnish Generation Including User Constraint

An embodiment of the invention provides the user with the ability to merge his own Varnish generation with the automatic Varnish generation. In a source file, the user needs to predefine, for one or more alpha channels, a gradient for defining where the user wants to apply the Varnish channel, e.g. for an 8-bit channel: 0 is no White, 255 is 100% Varnish. The combination with the automatic Varnish generation is defined for each and/or all alpha channel with pre-defined rules for the channel interactions.

These rules are defined using blending modes, e.g. for three simple rules:

Merge: allows the user to add Varnish content to the existing automatic Varnish channel (Varnish addition);

Priority: erases all Varnish content from other channels (Varnish exclusion). It gives the current channel the priority to the existing automatic Varnish channel; and Mask: uses the channel gray levels to define where to apply Varnish from the automatic Varnish generation and all enabled channels below.

Presently preferred formulae for applying this embodiment of the invention include:

Vu=% varnish defined the User in the alpha channel
Va=% varnish defined by the algorithm Merge %=max($Vu+Va$:1)

Priority %=max($Vu$:$Va$)

Mask %=$Su \times Sa$

Other blending mode could be also created for more effects.

Automatic Color Variation with Variable Thickness Under the Inks

An embodiment of the invention generates a variable thickness of an in-color varnish under colored inks, e.g. CMYK, to modify the spectral reflectance and change the color perception. In an embodiment of the invention, the process inks, e.g. CMYK inks, must be mostly transparent, while the varnish inks must also be mostly transparent. The thickness layer, which is calculated from the color information contained in the source image, is modulated by the density variation without half-tone, i.e. only ink volume variation, to provide a smooth texture.

In an embodiment of the invention, the color separation is automatic, as discussed above.

Variable Gamut Mapping for Low Contrast Space

In a low contrast space, e.g. for textiles or ceramics, gamut reduction is important. It is possible to optimize the gamut mapping with a single formula for all of the colors but, at the end, most users want to make a manual correction to obtain a better visual matching. An embodiment of the invention makes a contextual gamut mapping to adapt the color compression in accordance with the spatial information contained in the source image. In an embodiment, the first level of correction is the Lightness adaptation.

Computer Implementation

Figure 3:
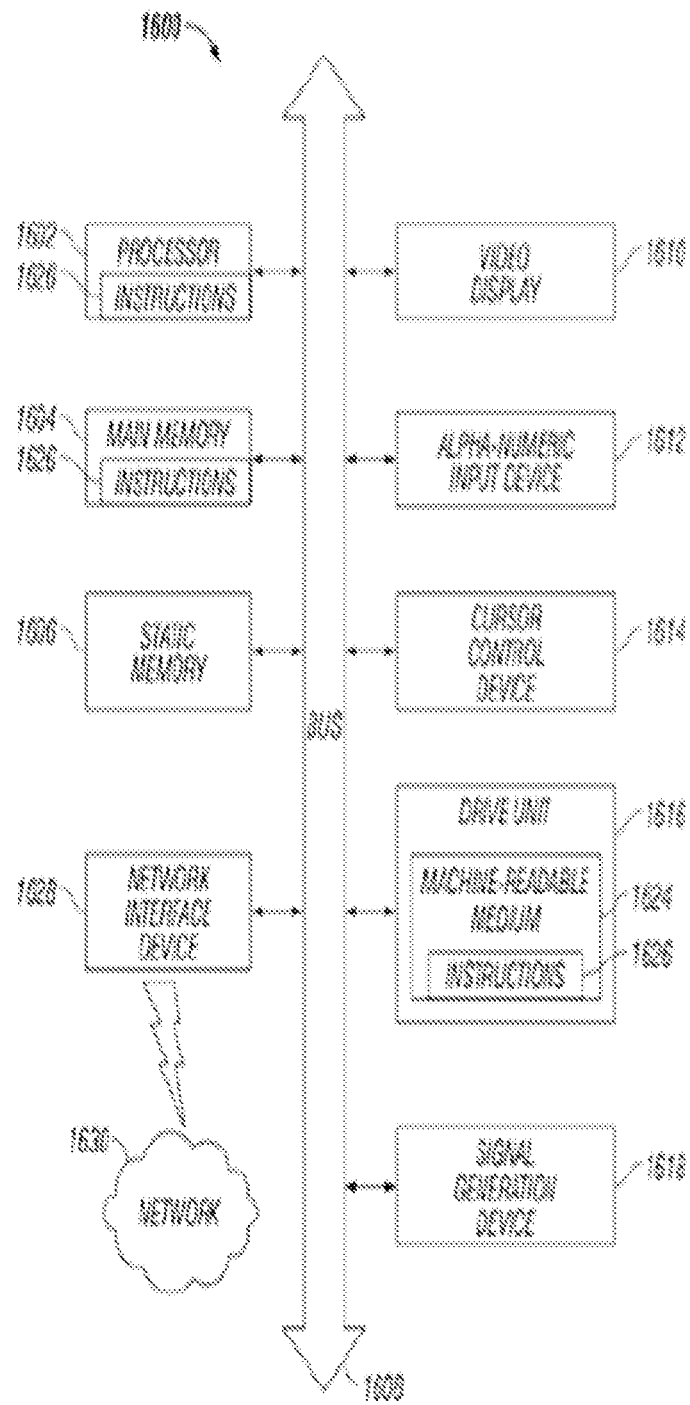
FIG. 3 is a block schematic diagram that depicts a machine in the exemplary form of a computer system within which a set of instructions for causing the machine to perform any of the herein disclosed methodologies may be executed.

FIG. 3 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for automatic color separation with a white ink for a colored substrate, comprising:
   receiving a low contrast image having no information regarding a white scale;
   generating a half-toned white layer to compensate for the low contrast image when said image is printed on a colored substrate; and
   printing said image using transparent process inks and printing said half-toned white layer using an opaque white ink by applying a rule for making a smooth transition between areas with white ink and those without white ink based on a fixed anchor point used to generate, using linear interpolation, another combination of CMYK+W.

2. A computer implemented method for automatic color separation with a silver ink for a natural rendering, comprising
   generating a graduated metallic layer, wherein a gradient information is calculated from information contained in a source image, to create a specular effect by printing colored inks on a metallic ink, said calculating comprising: creating a device linearization for silver ink for a printing device or determining a relation between (n)CLR+Silver of the printing device and a colorimetric value; and
   printing said image using transparent process inks and printing said graduated metallic layer using an opaque metallic ink.

3. A computer implemented method for automatic color separation with a gloss/matt varnish for a false 3D rendering, comprising:
   generating one or more graduated gloss layers, wherein a gradient information is calculated from color information contained in a source image, to create a gloss effect by printing colored inks under a gloss or matt ink or varnish, with or without color; and
   printing said image using transparent process inks and printing said one or more graduated gloss layers using transparent varnish inks;
   wherein a one or two gloss scale is used to increase the gloss effect and extend the scale of the effect.

4. A computer implemented method for automatic color variation with variable thickness under applied inks, comprising:
   generating a variable thickness of an in-color varnish under colored inks to modify spectral reflectance and change color perception of a printed image, wherein the thickness layer is calculated from color information contained in a source image;
   modulating said thickness layer by a density variation with halftone and/or, ink volume variation, to provide a smooth texture; and
   printing said image using transparent process inks and printing said variable thickness of the in-color varnish using transparent varnish ink.

* * * * *